(12) United States Patent
Messere et al.

(10) Patent No.: US 7,003,920 B1
(45) Date of Patent: Feb. 28, 2006

(54) TRANSPARENT GLAZING AND USE THEREOF IN A CHILLING CHAMBER DOOR COMPRISING IN PARTICULAR A GLAZING UNDER VACUUM

(75) Inventors: Rino Messere, Modave (BE); Anne-Sophie Hebert, Compiegne (FR); Jean-Michel Florentin, La Ferte sous Jouarre (FR)

(73) Assignee: Saint-Gobain Glass France, Courbevoie (FR)

( * ) Notice: Subject to any disclaimer, the term of this patent is extended or adjusted under 35 U.S.C. 154(b) by 0 days.

(21) Appl. No.: 09/926,609

(22) PCT Filed: May 25, 2000

(86) PCT No.: PCT/FR00/01424

§ 371 (c)(1),
(2), (4) Date: Aug. 30, 2002

(87) PCT Pub. No.: WO00/71481

PCT Pub. Date: Nov. 30, 2000

(30) Foreign Application Priority Data

May 25, 1999 (FR) .................................. 99 06586

(51) Int. Cl.
 E06B 3/00 (2006.01)
 E04C 2/54 (2006.01)
 B32B 17/10 (2006.01)
 B32B 27/40 (2006.01)

(52) U.S. Cl. .................... 52/204.5; 52/784.1; 428/334; 428/423.1; 428/426; 428/441; 428/913

(58) Field of Classification Search ................ 428/323, 428/325, 331, 332, 334, 913, 423.1, 426, 428/441, 434; 52/786.1, 786.11, 794.1, 204.5, 52/784.1; 312/405
See application file for complete search history.

(56) References Cited

U.S. PATENT DOCUMENTS

| 3,992,171 A | 11/1976 | Jenewein |
| 4,024,494 A | 5/1977 | Quesnel |
| 4,053,972 A | 10/1977 | Kordes |
| 4,134,626 A | 1/1979 | Kordes |
| 4,206,615 A | 6/1980 | Sobajima et al. |
| 4,477,129 A | 10/1984 | Heaney |
| 4,478,909 A * | 10/1984 | Taniguchi et al. .......... 428/331 |
| 4,583,796 A | 4/1986 | Nakajima et al. |
| 4,656,781 A | 4/1987 | Niekrasz et al. |
| 4,767,671 A | 8/1988 | Parker et al. |
| 4,859,532 A | 8/1989 | Oyama et al. |
| 5,117,587 A | 6/1992 | Doan |
| 5,157,940 A | 10/1992 | Bertu et al. |
| 5,210,169 A | 5/1993 | Mühlebach et al. |
| 5,262,475 A * | 11/1993 | Creasy ..................... 525/58 |
| 5,324,573 A | 6/1994 | Evans |
| 5,449,885 A | 9/1995 | Vandecastele |
| 5,476,682 A | 12/1995 | Evans |
| 5,584,143 A | 12/1996 | Kennedy |
| 5,753,373 A * | 5/1998 | Scholz et al. ............... 428/429 |
| 5,766,739 A | 6/1998 | Funaki et al. |
| 5,778,689 A | 7/1998 | Beatenbough |
| 5,784,896 A | 7/1998 | Tronnes et al. |
| 5,852,284 A | 12/1998 | Teder et al. |
| 5,877,254 A | 3/1999 | La Casse et al. |
| 5,962,090 A | 10/1999 | Trautz |
| 6,052,965 A * | 4/2000 | Florentin et al. ......... 52/786.13 |
| 6,144,017 A | 11/2000 | Millett et al. |
| 6,148,563 A | 11/2000 | Roche et al. |
| 6,238,755 B1 | 5/2001 | Harvey et al. |
| 6,394,613 B1 * | 5/2002 | Hatakeyama et al. ....... 359/507 |
| 6,606,832 B1 | 8/2003 | Richardson et al. |
| 6,606,833 B1 | 8/2003 | Richardson et al. |
| 6,866,936 B1 | 3/2005 | Opolski |
| 2002/0073645 A1 | 6/2002 | Richardson et al. |
| 2003/0203991 A1 | 10/2003 | Schottman et al. |
| 2003/0205059 A1 | 11/2003 | Roche et al. |
| 2004/0137155 A1 | 7/2004 | Bernheim et al. |
| 2004/0194388 A1 | 10/2004 | Roche et al. |
| 2004/0222724 A1 | 11/2004 | Cording |

FOREIGN PATENT DOCUMENTS

| EP | 0 036 657 | 9/1981 |
| EP | 0 870 450 | 10/1998 |
| EP | 0 908 500 | 4/1999 |
| FR | 2 609 285 | 7/1988 |
| GB | 2 199 360 | 7/1988 |
| JP | 52 063186 | 5/1977 |
| JP | 59 021541 | 2/1984 |
| JP | 01 156390 | 6/1989 |
| JP | 02 110119 | 4/1990 |
| JP | 05222227 | * 8/1993 |
| JP | 10 167764 | 6/1998 |
| SU | 1 101 444 | 7/1984 |
| WO | WO 98/42163 | 9/1998 |
| WO | WO 00/71481 | 11/2000 |
| WO | WO 03/008877 | 1/2003 |

OTHER PUBLICATIONS

Machine translation of JP10167764.*
Hussman, "Always Clear", Mar. 2004.
Jul. 12, 2005, letter to Mr. Gregory J. Hartwig.
Jul. 1, 2005, Declaration Under 37 CFR 1.132 (Watchi Declaration)—4 pages, executed.

* cited by examiner

Primary Examiner—Holly Rickman
(74) Attorney, Agent, or Firm—Oblon, Spivak, McClelland, Maier & Neustadt, P.C.

(57) ABSTRACT

A transparent glazing unit having at least one viewing area, combined with an antifrosting adsorbent layer deposited on at least one surface of the said area, and its use in a door of a refrigerated enclosure and more particularly a glazed door, the glazed area of which essentially consists of a vacuum glazing unit.

3 Claims, No Drawings

TRANSPARENT GLAZING AND USE THEREOF IN A CHILLING CHAMBER DOOR COMPRISING IN PARTICULAR A GLAZING UNDER VACUUM

The invention relates to a transparent glazing unit and its use in a door of a refrigerated enclosure and more particularly to a glazed door, the glazed area of which essentially consists of a vacuum glazing unit.

The invention will be more particularly described with reference to doors of refrigerated enclosures in which cold or frozen products are displayed, but the invention must not be construed as being limited to products or applications of this type. This is because the expression "transparent glazing" mentioned above covers any type of glazing consisting of at least one glass sheet and/or of at least one sheet of a plastic which are intended for applications in the motor-vehicle industry, the building industry or the domestic electrical appliance industry.

When products preserved in a refrigerated enclosure have to remain visible, as is the case in many current commercial premises, the refrigerated enclosure is equipped with glazed parts which convert it into a refrigerated "display case", the usual name for which is "refrigerated sales cabinet". There are several alternative forms of these "display cases". Some of them are in the form of a cabinet and then it is the door itself which is transparent, while others are in the form of chests and it is the horizontal lid which is glazed in order to allow the contents to be seen.

In these types of display cases, it is necessary for the merchandise to remain perfectly visible to customers so that it is possible to preselect the merchandise without opening the "display case".

When the usual insulating glazing is used, the insulation is not perfect and the temperature of the surface of the glass sheet in contact with the ambient atmosphere is often below the temperature of the dew point, which may result in the phenomenon of condensation on this surface, affecting visibility.

The use of vacuum insulating glazing makes it possible to eliminate this drawback by providing very greatly enhanced insulation. Such insulation also has the advantage of reducing the energy costs.

U.S. Pat. No. 6,052,965 describes such a door of a refrigerated enclosure which includes a vacuum glazing unit. It thus proposes a door of a refrigerated enclosure essentially consisting of an insulating panel composed of at least two glass substrates between which a vacuum has been created, which substrates are separated from each other by studs distributed over the entire surface and are joined around their periphery by an inorganic seal. In this way, the conventional insulating glazing units normally used are replaced with one insulating glazing unit consisting of at least two glass sheets between which a vacuum has been created, which we will call hereafter vacuum insulating glazing. This type of vacuum insulating glazing has, for a total thickness markedly less than that of the conventional insulating glazing units, substantially improved thermal insulation properties.

Furthermore, the structure of such a vacuum insulating glazing unit has the advantage of giving it a stiffness and a strength which are equivalent to those of a single glazing unit of thickness equal to the sum of the thicknesses of the glass sheets, that is to say the glass sheets behave as a single sheet whose thickness is the sum of that of the two glass sheets. In this way, it is not necessary to combine this type of glazing with a support frame. Thus, the overall size is greatly reduced and it is very simple to fit it into the environmental enclosure.

Such a door of a refrigerated enclosure, essentially consisting of a vacuum insulating glazing unit, makes it possible to solve the problem of condensation on the external surface: this is because the thermal insulation of this glazing unit makes it possible to obtain an external surface at the ambient temperature.

On the other hand, this enhanced insulation means that the internal surface of the glazing or of the door is at the temperature of the refrigerated environment, something which accentuates the condensation phenomenon when the door is opened: the temperature of the internal surface is such that, in the case of freezer cabinets, frosting may be seen to form on the said surface.

The usual techniques for preventing the condensation and/or frosting which forms on the internal surface of the doors consist in blowing heated air over this surface. Whatever the technique used, the energy cost is high; the cost penalty is even greater in the case of a vacuum insulating glazing unit, the time required to remove the condensation and/or the frosting being longer. Moreover, this longer time due to the very low temperature of the internal face goes counter to the intended aim which consists in obtaining an almost permanent area of visibility, including after opening the door.

The objective of the invention is thus in particular to produce a door of a refrigerated enclosure which includes a glazed area consisting of an insulating glazing unit, in which the frosting liable to form on the viewing area when the door is opened can be rapidly and inexpensively removed.

This objective is achieved according to the invention by a transparent glazing unit having at least one viewing area, this area being combined with an antifrosting adsorbent layer deposited on at least one surface of the said area.

The antifrosting function of the layer means that it inhibits the formation of water crystals.

Such a glazing unit, especially when it is an insulating glazing unit and more particularly a vacuum insulating glazing unit, can be used in a door of a refrigerated enclosure having at least one viewing area consisting, for example, of the said vacuum insulating glazing unit combined with an adsorbent layer advantageously deposited on that surface of the said viewing area which is in contact with the refrigerated environment.

It has been shown that such a door, comprising the glazing according to the invention, makes it possible to prevent the frosting phenomenon, or more precisely to delay it or at the very least limit its appearance.

According to a first embodiment, the antifrosting adsorbent layer is deposited directly on the glass, and more specifically on that surface of the vacuum insulating glazing unit which is in contact with the refrigerated environment. This is the surface in contact with the refrigerated environment when the door is in its closed position. Such a layer may be deposited by techniques of the sputtering or coating type, especially of the flow-coating or deep-coating type, the deposition being carried out before or after manufacturing of the vacuum glazing unit. Advantageously, an adhesion primer of the silane type is provided; it is either deposited beforehand on the glass or at the same time as the layer is formed, the silanes being introduced into the composition of the antifrosting adsorbent layer.

According to a second embodiment, the antifrosting adsorbent layer is deposited, for example according to one of the abovementioned methods, on a plastic film and the plastic film is itself fastened to the vacuum insulating glazing unit. The plastic film used is advantageously a polycarbonate film preferably having a thickness of less than 3 millimeters, this plastic is especially chosen for its mechanical strength properties. The plastic film is fastened to the glazing in a sealed manner so that no trace of moisture can exist between the glass surface and the plastic film. It may be fastened, for example, by adhesive bonding around the periphery; the air layer possibly existing between the glass and the plastic film must then advantageously not exceed 3 mm. The fastening may also be achieved by means of an aluminum frame combined with a desiccant and an adhesive, similar to that for an insulating glazing unit of conventional construction; advantageously, the air layer between the glass and the plastic film then does not exceed 10 mm.

According to an advantageous embodiment of the invention, the antifrosting adsorbent layer consists of at least one hydrophilic polymer. Such a polymer may be non-limitingly chosen from the following polymers: a polyvinylpyrrolidone of the poly (N-vinyl-2-pyrrolidone) or poly (1-vinylpyrrolidone) type, a polyvinylpyridine of the poly (N-vinyl-2-pyridine) type, of the poly(N-vinyl-3-pyridine) type or of the poly (N-vinyl-4-pyridine) type, a polyacrylate of the poly (2-hydroxyethyl acrylate) type, a polyacrylamide of the poly (N',N-hydroxyacrylamide) type, a polyvinyl acetate, a polyacrylonitrile, a polyvinyl alcohol, a polyacrolein, a polyethylene glycol or a polyoxyethylene. It may also be a copolymer based on two or more of the abovementioned polymers.

Preferably, the invention specifies that the layer consists of at least one crosslinked hydrophilic polymer. Crosslinking the polymer makes it possible, in particular, to obtain better cohesion of the layer and thus to prevent any risk of the layer being dissolved by water, over the long or short term.

According to a preferred embodiment of the invention, the hydrophilic polymer is combined with an organic or inorganic absorbent material, the said absorbent material preferably being porous.

An inorganic absorbent material especially improves the mechanical strength of the layer and more particularly prevents the formation of scratches. The inorganic function is advantageously achieved by depositing a mesoporous material (CPG-MCM 41), such as $TiO_2$ nanoparticles, or by depositing orthosilicate hydrolysis condensation products, or other silicon derivatives.

An organic absorbent material especially allows retention of the hydrophilic polymer; a polyurethane is used, for example.

The inventors have thus been able to demonstrate that the presence of a porous layer which includes a hydrophilic polymer on the surface of the glazed area allows water to be adsorbed. This principle prevents the formation of water droplets and thus the formation of a film liable to frost over and affect visibility through the glazed area. The choice of hydrophilic polymer and of the porosity in the case of a porous absorbent material make it possible to control the antifrosting behaviour of the layer. In particular, increasing the porosity allows the rate of water adsorption and the water absorptivity, as well as the level of water in microdroplet form, to be controlled.

According to a preferred embodiment of the invention, the porosity of the layer is between 0.1 and 1000 $cm^3/g$. In the case of a polymeric material, it is advantageously between 0.1 and 100 $cm^3/g$ and preferably less than 20 $cm^3/g$. It is preferably between 200 and 1000 $cm^3/g$ in the case of a mesoporous material. The porosity defines the void volume of the pores per unit mass of the layer.

Also preferably, the layer has pores whose mean diameter is between 0.05 and 50 microns, preferably between 0.1 and 20 microns and more preferably between 1 and 15 microns. The shapes of the cavities making up the pores are oval or spherical.

Whatever the nature of the antifrosting adsorbent layer and the method of producing the latter, it advantageously has a thickness of less than 100 microns, preferably less than 50 microns and more preferably less than 35 microns and, in some cases, preferably less than 25 microns and more preferably less than 20 microns.

Further details and advantageous characteristics of the invention will emerge below from the description of illustrative examples of the invention and of tests carried out.

As described above, a door or a refrigerated sales cabinet was produced. It consists especially of a vacuum insulating glazing unit in order to form the viewing area and of a door frame, for example made of metal. This frame may especially support all the mechanical systems of the handle and hinge type, as well as the seals which seal against the walls of the refrigerated enclosure.

The insulating glazing unit consists of two glass sheets between which a vacuum has been created. The glass sheets are separated from each other by studs distributed over the entire surface of the glazing and are joined together around their periphery by a seal of inorganic adhesive. Such a vacuum insulation glazing unit is, for example, produced according to a technique as described in Patent Application EP 645 516.

According to the invention, a polycarbonate film having a thickness of 2 millimeters is fastened to the vacuum insulating glazing unit by means of an adhesive forming a strip with a thickness of 1 millimeter around the periphery of the glazing. Thus, an air cavity is formed between the glazing and the completely sealed polycarbonate film. This complex is produced in such a way that the trapped air is dry. The film is fastened to that side of the vacuum insulating glazing unit which is intended to face the inside of the refrigerated enclosure when the door is in its closed position.

Before attaching it, the polycarbonate film is coated with an antifrosting adsorbent layer, this being deposited so as to face the inside of the refrigerated enclosure when the door is in the closed position. The layer thus deposited forms a polymeric porous three-dimensional network based on polyvinylpyrrolidone and polyurethane.

Measurements were carried out on the layer in the wet state using transmission electromicroscopy; these measurements allow the thickness of the layer and the size of the pores to be checked. The thickness of the layer is equal to 14.5 microns and the pores have a mean diameter varying from 1 to 8 microns.

Tests were carried out on various types of doors. These doors are fitted onto refrigerated sales cabinets within which a temperature of −28° C. is maintained. The cabinets themselves are placed in an atmosphere at a temperature of 25° C. The tests consist in opening the door for a period of 3 minutes and a period of 12 seconds. The 3-minute period simulates the average time needed for this type of cabinet to be stocked up in the morning. The 12-second duration simulates the average time needed for a consumer to take one or more products.

The measured results are the times needed for satisfactory visibility through the door to return, that is to say the times needed to remove the condensation and/or frosting.

The first door tested, A, has an insulating glazing unit consisting of three glass sheets. The second door tested, B, has a vacuum insulating glazing unit.

The third door, C, is that according to the invention that has just been described.

The results are given in the table below:

|   | 3-min opening | 12-s opening |
|---|---|---|
| A | 8 min 20 s | 1 min 15 s |
| B | 31 min 10 s | 1 min 40 s |
| C | 0 s | 0 s |

From these results it is clearly apparent that door C, produced according to the invention, prevents the formation of frosting.

Another test was carried out under similar conditions. Only the nature of the layer differs in this second example. This second example consisted in depositing a layer consisting only of a hydrophilic polymer; this hydrophilic polymer was based on polyvinylpyrrolidone, having a molecular mass of 1,300,000 g/mol and diluted to 10% by mass in ethanol. The composition thus obtained was then deposited on the glass by flow coating.

Tests such as those described above, consisting in opening the door for a period of 12 seconds and for 3 minutes, were carried out. In both cases, there was no sign of any frosting on the viewing area of the door.

The presence of the adsorbent layer therefore prevents the formation of frosting when the door is opened under normal operating conditions.

What is claimed is:

1. A refrigerator door enclosure, comprising a metal door frame, a transparent glazing, a handle, and a hinge, said glazing comprising at least one viewing area, wherein the viewing area has deposited on at least one surface thereof an antifrosting adsorbent layer consisting essentially of a porous polymeric coating of a three dimensional network of polyvinylpyrrolidone and polyurethane, and wherein:

the antifrosting adsorbent layer has a thickness of at least 14.5 microns and at most 100 microns; and said at least one surface and antifrosting adsorbent layer, after being maintained in a closed refrigerated environment at −28° C., prevents the visible formation of condensation and frosting upon exposure to room temperature and humidity for twelve seconds.

2. The refrigerator door enclosure according to claim 1, wherein the antifrosting adsorbent layer has a thickness of less than 20 microns.

3. The refrigerator door enclosure according to claim 1, wherein said at least one surface and antifrosting adsorbent layer, after being maintained in a closed refrigerated environment at −28° C., prevents the visible formation of condensation and frosting upon exposure to room temperature and humidity for three minutes.

* * * * *